Patented Aug. 14, 1951

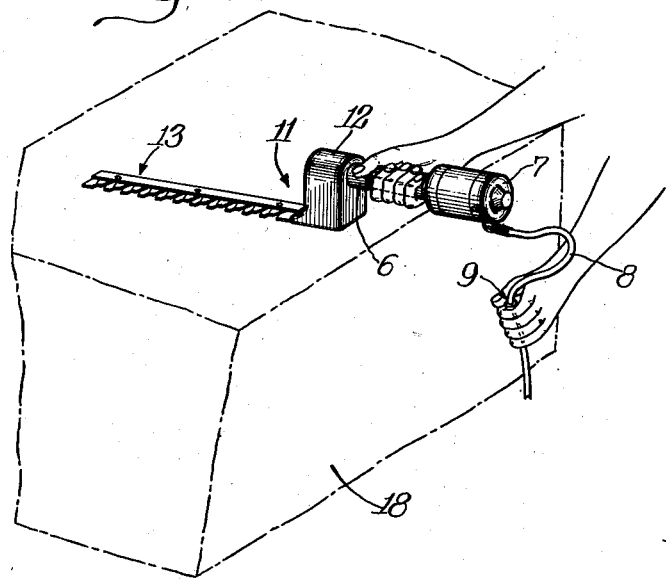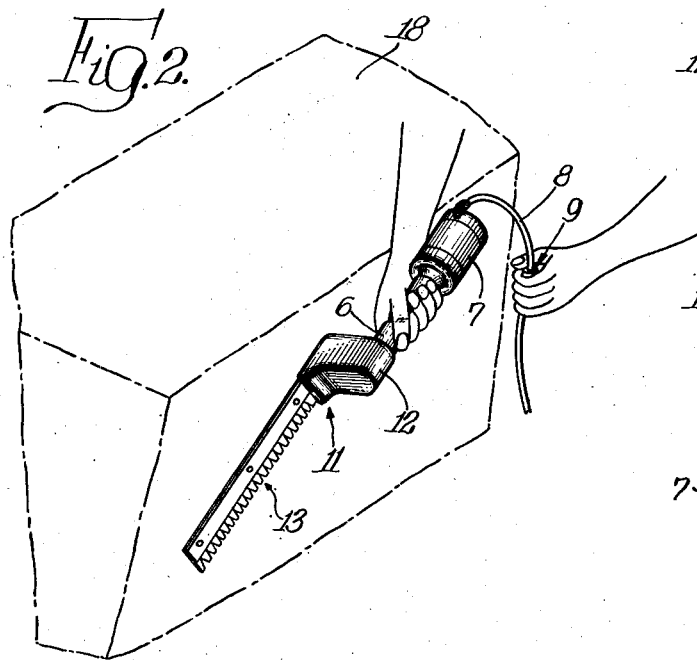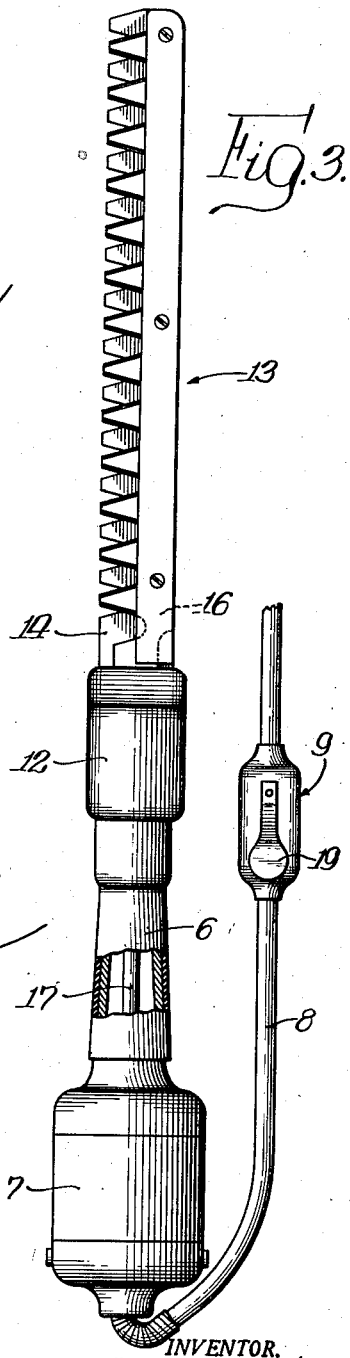

2,564,032

UNITED STATES PATENT OFFICE 2,564,032

HEDGE TRIMMING DEVICE

Lloyd T. Roberton, Oak Park, Ill., assignor to King Pneumatic Tool Company, Chicago, Ill., a corporation of Illinois Application July 20, 1948, Serial No. 39,668

1 Claim. (Cl. 30—216)

This invention relates to power driven hedge trimmers and particularly to electrically operated machines of this character.

A power driven hedge trimmer of the various types available commercially usually comprises a power unit or motor, a cutting unit, and a handle for manipulating the device. In certain of these devices the handle is located at one end of the trimmer with the result that the total weight of the outwardly extending motor and cutting unit must be counterbalanced by the hand of the user who grasps the handle portion. Obviously, such a device is cumbersome and tiring in use so that in many cases a second or auxiliary handle is provided, usually more or less centrally of the device, in order to assist in supporting the weight of the motor and cutting unit and to facilitate balanced manipulation of the trimmer. Thus, both hands of the user are required for satisfactory operation of the trimmer.

In other types of commercially available hedge trimmers the handle of the device is of a generally arcuate or U-shaped character with the grasping portion being disposed above the motor so that the weight of the device is concentrated primarily below the hand of the user when the device is being utilized for trimming in a horizontal plane. However, this form of hedge trimmer is objectionable and difficult to manipulate when it is desired to turn the device sideways for trimming hedge or other vegetation in an upright or vertical plane. It will be apparent that when such a device is held sideways with the motor and cutting unit in horizontally spaced relationship with respect to the grasping portion of the handle, an intensive torque is exerted by the weight of the motor and cutting unit tending to rotate or twist the device in the hand of the user.

Accordingly, a primary object of the present invention is to provide a hedge trimmer in which the various portions of the device are so positioned with respect to the handle portion that the trimmer may be conveniently and readily manipulated with only one hand of the user.

A further object of the invention is to provide a power driven hedge trimmer in which the various portions of the device are connected in counterbalancing relationship for easy balanced manipulation of the device in trimming in either a horizontal or vertical plane.

An additional object of the invention is to provide a power driven hedge trimmer in which the power unit and cutting unit are disposed at opposite ends of the handle portion in counterbalancing relationship longitudinally thereof.

Another object of the invention is to provide a power driven hedge trimmer in which the various portions of the device are so positioned relative to the handle that the device may be readily manipulated by one hand of the user and in which the device may be operated only when an operating switch is held in closed position by the other hand of the user whereby to avoid any danger of the user's other hand coming into contact with the blade of the cutting unit.

Other objects and advantages of the invention will become apparent from the subsequent description of the invention and the accompanying drawing, in which:

Fig. 1 is a perspective view of one embodiment of my invention showing the manner in which the device may be used for trimming a hedge in a horizontal plane;

Fig. 2 is a perspective view of the device showing its use in trimming a hedge in a vertical plane; and Fig. 3 is a top plan view of the device.

Referring now to the drawing, one specific embodiment of my invention is shown, merely by way of example, as comprising a centrally located, elongated, hollow handle portion 6 having an electric motor 7 rigidly secured at one end thereof and in axial alignment therewith. Electrical conducting means, such as a wire 8, is connected to the motor 7 and is provided with a spring operated switch 9 for closing and opening the electrical circuit through the motor 7.

Mounted at the opposite end of the handle portion 6 is a cutting unit, indicated generally at 11, comprising a drive mechanism enclosed in a suitable casing 12 and extending laterally from the handle portion 6. An elongated blade portion 13 extends longitudinally from the casing 12 in a direction generally parallel to the handle portion 6 and comprises a stationary toothed member 14 and a reciprocable toothed cutting blade 16 operably connected to the drive mechanism within the casing 12.

A rotary drive shaft 17 (Fig. 3) extends from the motor 7 through the interior of the hollow handle portion 6 and longitudinally thereof into the casing 12. The drive mechanism within the casing 12 forms no part of the present invention and may comprise any suitable mechanism, of which many types are well known in the art, operably connected to the drive shaft 17 and to the reciprocable cutting blade 16 for converting rotary motion of the shaft 17 to reciprocating motion of the blade 16.

An important feature of my invention is the relative location of the motor 7 and the cutting unit 11 at opposite ends of the handle portion 6 whereby, when the device is grasped by the handle portion 6, the motor 7 and cutting unit 11 are in counterbalancing relationship with respect to the handle portion 6 and longitudinally of the device. Thus, when it is desired to utilize the device for trimming a hedge 18 in a horizontal plane, as shown in Fig. 1, the user may readily support the device with little effort using only one hand to grasp the handle portion 6, and the blade portion 13 may be moved with ease in a horizontal plane across the top of the hedge. It will be understood, of course, that the branches of the hedge or other vegetation extend upwardly through the spaces in the stationary toothed member 14 and are trimmed by the cutting action of the toothed blade 16. It will be apparent that when the device is manipulated, as shown in Fig. 1, the trimmer is disposed in well balanced condition in the hand of the user thereby requiring little effort or exertion on the part of the user to control the device in a satisfactory manner.

In Fig. 2 of the drawing, another important advantage of my invention is demonstrated. In this view, the trimmer is being held in a side position for trimming the hedge 18 in an upright or substantially vertical plane. Inasmuch as the motor 7 is mounted coaxially with the handle portion 6, it will be seen that in any angular position of the trimmer the motor 7 will exert no torque as a result of its weight tending to twist or rotate the device in the hand of the user. It is desirable to restrict to a minimum the height of the drive mechanism and its casing 12 extending between the handle portion 6 and the blade portion 13 in order to minimize the torque acting upon the handle portion 6 as a result of the weight of the cutting unit 11. Thus, even when my device is used in a side position for trimming in a vertical plane, the device may still be easily and readily manipulated with one hand without the development of excessive torque which would render the trimmer unwieldy and difficult to control.

In view of the ease of manipulation and balanced construction of my device enabling it to be held in any desired trimming position with only one hand of the user, it becomes important from a safety viewpoint to make suitable provision for preventing the user from accidentally bringing his free hand into engagement with the blade of the cutting unit. Since the device may be so easily handled with one hand, there is often a dangerous tendency on the part of the user to employ his other hand to guide or arrange the vegetation for proper trimming in the vicinity of the cutting unit.

Accordingly, an important feature of my invention is the spring operated switch 9 which is provided with a depressible actuating member or lever 19. The member 19 is normally in elevated or non-depressed position with the result that the electrical circuit to the motor 7 is normally open. Thus, the trimmer may be operated only when the member 19 is held manually in depressed or closed position for operating the motor 7. As clearly seen in Figs. 1 and 2, it is necessary for the user of the device to grasp the handle portion 6 with one hand and to hold the switch 9 in closed position with his other hand thereby avoiding any possibility of accidental manual contact with the cutting unit while the latter is in operation. In the event that the user should absentmindedly place his hand on the hedge 18 adjacent the blade portion 13 of the cutting unit, the switch 9 will automatically be restored to open position and the motor 7 will stop.

From the foregoing it will be seen that the power driven portable hedge trimmer of my invention incorporates in a simple, durable, and easily manufactured unitary structure the advantages of balanced relationship of the several portions of the device, ease of manipulation, and safety in operation.

Although the invention has been described primarily with respect to one specific structural embodiment, it will be apparent that various modifications and equivalent structures may be employed without departing from the scope of the invention as defined in the appended claim.

I claim:

A hedge trimming device adapted to be supported in operating position by one hand of a user, said device comprising a tubular handle portion of length sufficient to accommodate only one hand of the user and not substantially longer, a cutting unit comprising a drive mechanism extending laterally at one end of said handle portion and a blade portion extending longitudinally from said drive mechanism in substantially parallel offset relation to said handle portion whereby the hand of the user is protected from scraping against the material being trimmed during use of the device, an electric motor carried at the opposite end of said handle portion coaxially therewith and operably connected through said handle portion to said drive mechanism, said cutting unit and said motor being thereby disposed in counterbalancing relation longitudinally of the device when the device is grasped by said handle portion and the coaxial relation of the motor thereby avoiding torque due to the weight of the motor tending to rotate the device about the axis of the handle portion in the hand of the user, and a normally open safety switch for said motor located in a position remote from said handle portion whereby when the handle portion of the device is grasped by one hand of the user, the motor can be operated only when said switch is held in closed position by the other hand of the user.

LLOYD T. ROBERTON.

REFERENCES CITED

The following references are of record in the file of this patent:

UNITED STATES PATENTS

| Number | Name | Date |
| --- | --- | --- |
| D. 80,228 | Raven et al. | Jan. 7, 1930 |
| 1,385,938 | Ziegler | July 26, 1921 |
| 1,660,764 | Pidlisny | Feb. 28, 1928 |
| 1,788,237 | Herman et al. | Jan. 6, 1931 |
| 1,897,117 | Graham | Feb. 14, 1933 |
| 2,268,221 | Mischker | Dec. 30, 1941 |

FOREIGN PATENTS

| Number | Country | Date |
| --- | --- | --- |
| 617,735 | Germany | Mar. 23, 1934 |